under Patent Office 3,062,636
Patented Nov. 6, 1962

3,062,636
METHOD AND COMPOSITION FOR CONTROLLING CRABGRASS
Joseph Regenstein, Jr., Chicago, Ill., assignor to Velsicol Chemical Corporation, Chicago, Ill., a corporation of Illinois
No Drawing. Filed June 29, 1959, Ser. No. 823,314
7 Claims. (Cl. 71—2.3)

This invention relates to new herbicidal compositions of matter. More specifically, this invention relates to new herbicidal compositions for the control of crabgrass.

Crabgrass is a term used to describe a group of summer annuals which cause extensive damage to lawns, turf, and other grassy areas. The crabgrass kills by taking moisture and nutrients from the soil and thus smothering and choking the desirable grasses. The grasses around each crabgrass plant are usually killed or seriously weakened. When the crabgrass dies, it leaves bare spots, liberally sprinkled with enough seeds to provide a serious infestation the next season. The two species of crabgrass which are the most widespread weed pests of lawns are *Digitaria ischaemum*, commonly known as smooth crabgrass, and *Digitaria sanguinalis*, usually known as common, large, hairy, tall, purple, fingergrass, turkeyfoot, crowfoot grass, and watergrass. At least fifteen other varieties of Digitaria species of crabgrass are known. Also generally classified with crabgrass are such weeds as goosegrass (*Eleusine indica*), broomsedge (*Andropogon virginicus*), pigeon grass or green bristle grass (*Setaria viridis*), yellow bristle grass (*Setaria lutescens*), watergrass (*Echinochloa crusgalli*), witchgrass (*Punicum capillare*), creatgrass or chess (*Bromus secalinus*), and downy bromegrass (*Bromus tectorum*).

Previous attempts to control crabgrass by the application of chemical compositions have been unsatisfactory. Crabgrass produces tiny seeds which remain dormant during the winter and early spring but sprout portionwise all during the summer, as long as the soil temperature is sufficiently high, sunlight is plentiful, and surface moisture is present. This characteristic of crabgrass seeds to germinate only partially at one time makes previously known herbicidal compositions unsatisfactory for their control. Thus, the application of such a herbicidal composition may destroy the crabgrass seedlings which are produced from the relatively small number of crabgrass seeds which actually germinate at one time. However, most of the remainder of the seeds continue to germinate over a period which can extend into the next or subsequent seasons, after years of dormancy. The herbicidal composition does not remain effective permanently to control the new seedlings as they appear, and the crabgrass is free to spread and destroy the desirable grasses in its area. Even repeated applications of herbicidal compositions, which are expensive, troublesome, and inconvenient, are unsatisfactory, since the crabgrass which develops rapidly in the periods between treatments often causes serious and permanent damage to the desirable grasses. Further, the application of frequently repeated high dosages of herbicidal compositions may in itself damage the desirable grasses.

It has now been found that crabgrass can be controlled effectively with the new compositions of this invention, which comprise chlordane, gibberellic acids, and a carrier. Chlordane, which is ordinarily sold as an insecticide, has been found to have a selective toxicity for crabgrass. When applied to soil prior to the germination of crabgrass seeds, it destroys the crabgrass seedlings as they emerge without damaging any of the beneficial grasses. However, chlordane when used alone has limited value for the control of crabgrass, since the crabgrass seeds do not germinate all at one time. During the late summer and fall, seeds drop from the branches that extend from the top of the stems, and a single plant may drop as many as 100,000 seeds. The plants die after they produce seed, or after the first killing frost, but only part of the seed supply germinates in any one season. The rest, which may be buried too deep or shaded too heavily to sprout, hibernate until conditions are right for germination. Thus, seed produced in the fall of one year may germinate any time during the summer of the following year, or it may remain dormant in the soil for several years before it sprouts. The result is that while chlordane is an excellent toxic agent for destroying germinating crabgrass, it has heretofore not been wholly satisfactory for the control of crabgrass, since it must be applied repeatedly as new seeds germinate. Even then, seeds do germinate in the times between treatments, with the result that the growing crabgrass effects its damage on the desirable grasses before it can be eradicated.

These serious problems in the control of crabgrass with chlordane have now been solved by the use of the new compositions of this invention. These compositions combine with chlordane the gibberellic acids, which have been found to be surprisingly effective in breaking the dormancy of crabgrass seeds. Where previously the seeds germinated spasmodically over many growing seasons, they now germinate more uniformly at a single time, with the result that the seedlings are uniformly destroyed by the chlordane which is present. No longer is there any need to make multiple applications of chlordane to grasses for the control of crabgrass, since a single application of the new compositions of this invention, which comprise gibberellic acids as well as chlordane, gives effective control.

The gibberellins are a group of chemically related plant growth substances produced by the Gibberella fungus. See, for example, the United States Department of Agriculture, Agricultural Research Service Special Report ARS 22–47, August 1958. The most commonly available form of gibberellins, also known as gibberellic acids, is as a white crystalline solid having a melting point of 233° C. (with decomposition) combining gibberellic acid, a compound having the empirical formula $C_{19}H_{22}O_6$, and gibberellin A, a compound having the empirical formula $C_{19}H_{24}O_6$.

Chlordane as used and referred to herein is the commercially produced or technical product consisting preponderantly of the compound 1,2,4,5,6,7,8,8-octachloro-4,7-methano-3a,4,7,7a-tetrahydroindane, the remainder being related active compounds arising during the manufacturing process. Such technical chlordane, referred to simply as chlordane hereinafter, is a viscous, amber-colored liquid having a boiling point of about 175° C. at 2 mm. Hg pressure and a specific gravity of from about 1.59 to 1.63.

The gibberellic acids and chlordane are combined with a carrier to provide the desired concentrations of the active components and to facilitate the application of the active components to the area wherein it is desired to control crabgrass. The carrier, which can be a single substance or a mixture of substances, can be selected to provide compositions of this invention which are either solids or liquids.

The finished compositions as they are actually applied for the control of crabgrass are designed to contain sufficient chlordane so that from about 0.5 to about 5 pounds of chlordane will be applied to each 1000 square feet of area. While concentrations of chlordane in this range are satisfactory for the control of crabgrass of different species under a variety of turf and weather conditions and with various schedules of timing the applications, a concentration range of from about 1 to about 3 pounds of chlordane per 1000 square feet is preferred. A concentration range of from about 1.5 to about 2 pounds of chlordane per 1000 square feet is most preferred.

Similarly, the finished compositions of this invention, as actually applied for crabgrass control, are designed to contain from about 1 to about 1000 parts of gibberellic acids per million parts of composition. While gibberellic acids concentrations in this range are satisfactory to exhibit the desired crabgrass controlling effects when combined with chlordane in the concentrations set out above, a preferred range of concentrations of gibberellic acids in the finished applied compositions is from about 5 to about 500 parts per million. A concentration range from about 10 to about 100 parts per million is most preferred.

However, this invention also embraces highly concentrated compositions of chlordane and gibberellic acids in a carrier which are prepared for convenience and economy and can be stored, shipped to the user, and ultimately diluted with carrier to provide the actual concentrations of chlordane and gibberellic acids as set out above for final application to the locus wherein it is desired to control crabgrass. Such concentrate compositions ordinarily contain up to about 80% by weight of chlordane and 1.6% by weight of gibberellic acids in a carrier. Preferred concentrate compositions contain from about 45% to about 75% by weight of chlordane and from about 0.03% to about 0.375% by weight gibberellic acids in a carrier. When it is desired to make actual application of these compositions to areas for crabgrass control, they can be diluted infinitely with carrier to provide the actual concentrations of chlordane and gibberellic acids as set out above. Dilutions to concentrations below about 0.5% by weight of chlordane and about 0.0001% by weight gibberellic acids can be made but are less convenient because of the large volumes of carrier required.

The compositions of this invention can be prepared in a variety of solid or liquid forms. For example, emulsifiable concentrate compositions comprising chlordane, gibberellic acids, a suitable solvent, and a surface active agent are a preferred form, since these concentrates can be extended with water to provide any desired concentrations of chlordane and gibberellic acids for crabgrass control. The use of a particular solvent is not critical, but typical examples of suitable solvents are dimethyl formamide, ethanol, methyl acetone, diacetone alcohol, isopropanol, acetone, mesityl oxide, and the like. The surface-active agents can be of the anionic, cationic or nonionic types. Typical examples of such surface-active agents are sodium lauryl sulfate, sodium 2-ethylhexyl sulfate, sodium naphthalenesulfonate, sodium alkylnaphthalenesulfonate, sodium sulfosuccinate, sodium castor oil sulfonate, glycerol monostearate containing a soap (or a sodium fatty alcohol sulfate), sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, di- and higher polyhydric alcohol fatty acid esters, lanolin, oxidized fatty oils, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the concentrate compositions. Liquid compositions of this invention particularly suitable for the control of crabgrass in small areas are aerosols, which comprise chlordane, gibberellic acids, a solvent, a surface-active agent if required, and a propellant, a substance which is liquid when contained under pressure but which volatilizes rapidly at atmospheric pressure and hence enables the composition to be discharged as a spray through a fine orifice.

Solid compositions of this invention can be prepared, for example, as dusts, wettable powders, or granules. Dusts can be prepared by combining the chlordane and gibberellic acids with finely ground solid carriers such as attapulgite, diatomite, kaolinite, talc, calcium carbonate, pyrophyllites, phosphate rock, pumice, calcium stearate, perlite, and the like. A small amount of solvent can be use to assist in preparing homogeneous dust compositions according to this invention. Granules are small, uniform particles, each containing a particular quantity of chlordane and gibberellic acid, which can be prepared by impregnating the active components in a solvent on the solid carrier as above and then blending the mixture, preferably to a mesh size of 20/40 or smaller to form granules, which are a particularly convenient means of applying the compositions of this invention evenly over an area for crabgrass control. Wettable powders, which comprise chlordane, gibberellic acids, a finely ground solid carrier, and a surface-active agent, are also very suitable compositions according to this invention. They are prepared in the same manner as dusts, but for use they are mixed with water to be applied as sprays. In all these compositions of this invention, mixtures of several solid carriers, solvents, or surface-active agents can be used to provide a carrier with properties particularly suited to the chlordane and gibberellic acids. Other pesticides as well as such substances as fertilizers, activators, adhesives, spreaders, deactivators, and the like can be added to these compositions if desired.

The preparation and use of typical compositions according to this invention is illustrated in the following examples. All quantities given are in parts by weight.

EXAMPLE 1

*Preparation of an Emulsifiable Concentrate*

The following components are mixed thoroughly until a homogeneous mixture is obtained:

| | |
|---|---|
| Chlordane | 73.0000 |
| Gibberellic acids | 0.0128 |
| Anhydrous diacetone alcohol | 19.9872 |
| Emcol mixed emulsifier (60% H300X+40% H500X) | 7.0000 |

The Emcols H300X and H500X are the calcium alkyl aryl sulfonate and polyoxyethylene ether surface-active agents supplied by the Emulsol Corporation.

This concentrate is then extended with water to obtain the desired concentrations of chlordane and gibberellic acids to be applied as a spray for crabgrass control. For example, this concentrate can be made up in pounds and extended with water to provide an emulsion containing 10 p.p.m. of gibberellic acids, which can be applied in sufficient quantity to give 1.5 pounds of chlordane per 1000 square feet of area.

EXAMPLE 2

*Preparation of an Emulsifiable Concentrate*

The following components are mixed thoroughly until a homogeneous mixture is obtained:

| | |
|---|---|
| Chlordane | 80.0 |
| Gibberellic acids | 1.6 |
| Anhydrous isopropanol | 13.4 |
| Atlox 1045 | 5.0 |

Atlox 1045 is the polyoxyethylene sorbitol laurate surface-active agent supplied by the Atlas Powder Company. The composition can be prepared on a pound basis, for example, and extended with water to give an emulsion containing 1000 p.p.m. of gibberellic acids, which can be applied to the locus of the crabgrass infestation in sufficient quantity to give 5 pounds of chlordane per 1000 square feet of area.

EXAMPLE 3

Preparation of an Emulsifiable Concentrate

The following components are mixed thoroughly until a homogeneous mixture is obtained:

| | |
|---|---|
| Chlordane | 75.000 |
| Gibberellic acids | 0.375 |
| Anhydrous methyl acetone | 18.625 |
| Triton X-100 | 6.000 |

Triton X-100 is the alkyl polyether alcohol surface-active agent supplied by the Rohm & Haas Co. This concentrate, when prepared on a pound basis, can be extended with water to give an emulsion, containing for example 100 p.p.m. of gibberellic acids, which can be applied in sufficient quantity to give 2 pounds of chlordane per 1000 square feet of the locus wherein it is desired to control crabgrass.

EXAMPLE 4

Preparation of a Wettable Powder

The following is a typical formulation:

| | |
|---|---|
| Chlordane | 45.00 |
| Gibberellic acids | 0.03 |
| Micro-Cel E | 11.97 |
| Diluex A | 40.00 |
| Igepon AP-78 | 1.50 |
| Marasperse N | 1.50 |

Micro-Cel E is the calcium stearate supplied by the Johns-Manville Co., Diluex A is the attapulgite clay supplied by the Floridin Co., Igepon AP-78 is the alkyl ester sulfonate surface active agent (85% sodium oleoyl isothionate+15% sodium chloride) supplied by Antara Chemicals, and Marasperse N is the lignin sulfonate surface-active agent supplied by the Marathon Corp. The wettable powder is prepared by charging the clay and calcium stearate into a mechanical blender, preparing a homogeneous mixture of the chlordane and gibberellic acids, impregnating the active components on the minerals mixture, adding the surface-active agents, blending, pulverizing, and reblending. The finish powder is then mixed with water to provide any desired concentrations of chlordane and gibberellic acids for crabgrass control. For example, this powder can be prepared on a pound basis and mixed with water to give a suspension, containing 10 p p.m. of gibberellic acids, which can be applied in sufficient quantity to give 1.5 pounds of chlordane per 1000 square feet of the area wherein it is desired to control crabgrass.

EXAMPLE 5

Preparation of a Dust

The following is a typical formulation:

| | |
|---|---|
| Chlordane | 20.00 |
| Gibberellic acids | 0.01 |
| Anhydrous diacetone alcohol | 2.00 |
| Attaclay | 77.99 |

Attaclay is the attapulgite clay supplied by the Minerals & Chemicals Corp. of America. The dust is prepared by first mixing the chlordane, gibberellic acids and diacetone alcohol together thoroughly. This mixture is then impregnated onto the clay in a mechanical blender, and the ingredients are blended until dry, pulverized, and reblended. Such a dust is suitably applied to 1000 square feet of area at the rate of about 7 pounds, 8 ounces, to provide 1.5 pounds of chlordane in a composition containing 100 p p.m. of gibberellic acids. This composition can also be diluted by blending it with additional clay.

EXAMPLE 6

Preparation of Granules

A typical formulation is as follows:

| | |
|---|---|
| Chlordane | 10.00 |
| Gibberellic acids | 0.01 |
| Florex | 84.99 |
| Anhydrous isopropanol | 5.00 |

Florex is the attapulgite clay supplied by the Floridin Co. The granules are prepared by proceeding as in the preparation of a dust, except that the components are not ground but are blended to the desired granule size, such as 20/40 mesh or smaller. Other granular compositions can be prepared in a similar manner. Thus, a highly dilute composition can be made by using 0.5 part of chlordane and 0.0001 part of gibberellic acids in the above composition, more clay being used to make a total of 100 parts in the finished composition. Such a granular composition prepared on a pound basis can then be applied at the rates of 2 or 6 pounds per 1000 square feet of locus to give effective chlordane dosages of 1 or 3 pounds, respectively, for this area. Similar changes in the rate of dilution can be made so that the concentration of gibberellic acids in the composition applied for crabgrass control will be, for example, 5 or 500 parts per million.

The new compositions of this invention are applied to the locus of the crabgrass infestation prior to the germination of the crabgrass seed. The exact time of the year for such application will vary according to the particular climate in the area where it is desired to control crabgrass, but generally the compositions of this invention can be applied any time from very early spring until one or two weeks prior to the time germination normally initiates. The compositions are applied at the rates of active components as set out in detail above. Where a highly concentrated composition has been prepared first, it is diluted with carrier as described in the examples above to provide the proper concentrations of chlordane and gibberellic acids for actual application.

I claim:

1. A composition for the accelerated control of crabgrass in a locus in a single seasonal treatment which comprises by weight up to about 80% chlordane, up to about 1.6% gibberellic acids, and a carrier therefor, said chlordane being present in a herbicidally toxic amount and said gibberellic acids being present in a growth stimulating amount.

2. A composition for the accelerated control of crabgrass in a locus in a single seasonal treatment which comprises by weight from about 0.5 to about 80% chlordane, from about 0.0001 to about 1.6% gibberellic acids, and a carrier therefor, said chlordane being present in a herbicidally toxic amount and said gibberellic acids being present in a growth stimulating amount.

3. A composition for the accelerated control of crabgrass in a locus in a single seasonal treatment which comprises by weight from about 45 to about 75% chlordane, from about 0.03 to about 0.375% gibberellic acids, and a carrier therefor, said chlordane being present in a herbicidally toxic amount and said gibberellic acids being present in a growth stimulating amount.

4. A method for the accelerated control of crabgrass which comprises applying to the locus of the crabgrass infestation in a single preemergence treatment, a quantity toxic to crabgrass of a composition comprising a herbicidally toxic amount of chlordane, a growth stimulating amount of gibberellic acids, and a carrier therefor.

5. A method as in claim 4, wherein the chlordane is applied at a rate of from about 0.5 to about 5 pounds per 1000 square feet of locus and the gibberellic acids are applied at a rate of from about 1 to about 1000 parts by weight per million parts of said composition.

6. A method as in claim 4, wherein the chlordane is applied at a rate of from about 1 to about 3 pounds per 1000 square feet of locus and the gibberellic acids are applied at a rate of from about 5 to about 500 parts by weight per million parts of said composition.

7. A method as in claim 4, wherein the chlordane is applied at a rate of from about 1.5 to about 2 pounds per 1000 square feet of locus and the gibberellic acids are applied at a rate of from about 10 to about 100 parts by weight per million parts of said composition.

References Cited in the file of this patent

UNITED STATES PATENTS

| | | |
|---|---|---|
| 2,472,347 | Sexton | June 7, 1949 |
| 2,498,302 | Sexton et al. | Feb. 21, 1950 |
| 2,842,051 | Brain et al. | July 8, 1958 |

OTHER REFERENCES

"Agricultural Chemicals," vol. 11, No. 1, p. 101, January 1956.

Leben in "Science," vol. 125, pp. 494 and 495, March 15, 1957.

Thurber in "Nature," vol. 181, No. 4615, pp. 1082 and 1083, April 12, 1958.

"Science Newsletter," March 1, 1958, p. 137.

Dybing et al. in "Weeds," vol. III, pp. 337 to 386, No. 4, October 1959.